(12) United States Patent
Scherzer et al.

(10) Patent No.: US 6,799,026 B1
(45) Date of Patent: Sep. 28, 2004

(54) HANDSET DIVERSITY IN WIRELESS COMMUNICATIONS SYSTEM

(75) Inventors: Shimon B. Scherzer, Sunnyvale, CA (US); Piu Bill Wong, Monte Sereno, CA (US)

(73) Assignee: Kathrein-Werke KG, Rosenheim (DE)

( * ) Notice: Subject to any disclaimer, the term of this patent is extended or adjusted under 35 U.S.C. 154(b) by 401 days.

(21) Appl. No.: 09/695,459

(22) Filed: Oct. 24, 2000

Related U.S. Application Data

(60) Provisional application No. 60/164,424, filed on Nov. 9, 1999.

(51) Int. Cl.$^7$ ................................................. H04B 7/00
(52) U.S. Cl. ..................... 455/279.1; 455/101; 455/222; 455/223; 455/224; 455/225; 455/226.1; 455/272.1; 455/272.2; 455/278.1; 455/500; 455/63.4; 325/148; 325/149; 320/335; 342/452
(58) Field of Search ...................... 455/101, 272–279.1, 455/500; 375/148, 149; 320/335; 342/452

(56) References Cited

U.S. PATENT DOCUMENTS

| | | | | | |
|---|---|---|---|---|---|
| 5,737,327 | A | * | 4/1998 | Ling et al. ................... | 370/335 |
| 6,014,570 | A | * | 1/2000 | Wong et al. ................. | 455/500 |
| 6,160,511 | A | * | 12/2000 | Pfeil et al. ................... | 342/457 |
| 6,330,433 | B1 | * | 12/2001 | Jager ........................ | 455/277.2 |
| 6,498,785 | B1 | * | 12/2002 | Derryberry et al. ......... | 370/311 |

* cited by examiner

*Primary Examiner*—Erika Gary
*Assistant Examiner*—David Q Nguyen
(74) *Attorney, Agent, or Firm*—Fulbright & Jaworski LLP

(57) ABSTRACT

A diversity reception handset includes a receiver for receiving pilot and plural increments of traffic sent from a base station within a service area of a wireless communications network. The handset includes at least two antennas, a switch for switching a receiver between the two antennas, a time-of-arrival searcher circuit connected to the receiver and responsive to the pilot for determining time of arrival of the received signals and expected time of arrival of each increment, and a controller for controlling the switch based upon determined expected time of arrival of each increment.

5 Claims, 3 Drawing Sheets

HANDSET DIVERSITY IN WIRELESS COMMUNICATIONS SYSTEM

CROSS REFERENCE TO RELATED APPLICATIONS

This application is related to and claims priority from U.S. Provisional Application Ser. No. 60/164,424, filed Nov. 9, 1999.

BACKGROUND

1. Field of Invention

The present invention relates to, and finds utility within, wireless information communications systems. More particularly, the present invention relates to diversity reception of downlink signals at the handset without requiring dual receive chains.

2. Related Art

Wireless radio telecommunications systems enable many mobile users or subscribers to connect to land-based wireline telephone systems and/or digital Internet service providers enabling access to the World Wide Web digital information backbone. Conventional wireless air-interfaces include frequency division multiple access (FDMA), time division multiple access (TDMA), and code division multiple access (CDMA), and improvements therein.

The CDMA air-interface calls for modulation of each carrier with a unique pseudorandom (pseudo-noise) code. As the CDMA users simultaneously occupy the same frequency band, the aggregate data signal transmitted by a fixed base station (forward link) is noise-like. A common pilot tone is transmitted to all mobiles within the effective service area of the base station. Individual signals are extracted at the mobile by correlation processing timed by the pilot tone.

The CDMA air-interface is in a state of constant improvement. A latest iteration of the CDMA standard is known as "third generation" or "3G". For digital data traffic one proposed solution for CDMA 3G is known as "CDMA/HDR", or simply "HDR". HDR uses known techniques to measure channel data transfer rate, to carry out channel control, and to mitigate and suppress channel interference. One approach of this type is more particularly described in a paper by Paul Bender, Peter Black, Matthew Grob, Robert Padovani, Nagabhushana Sindhushayana and Andrew Viterbi, entitled: "CDMA/HDR: A Bandwidth Efficient High Speed Wireless Data Service for Nomadic Users", published on the internet at the time of filing of this application by Qualcomm Corporation at the following URL: "http://www.qualcomm.com/hdr/pdfs/CDMA_HDR_IEEE.pdf". The disclosure of this article is incorporated herein in its entirety by this reference thereto. Principles articulated in this paper are being incorporated into a draft 3G specification, known as "Draft Baseline Text for the Physical Layer Portion of the 1xEV Specification" being proposed within the Third Generation Partnership Project Two (3GPP2), the disclosure thereof being incorporated herein in its entirety by this reference thereto.

In the 1xEV approach described in the above draft specification, each mobile station measures the received signal-to-interference-plus-noise ratio (SINR) based on the received common pilot sent out by the base station. The data rate which can be handled by the particular mobile is proportional to its SINR. Therefore, the mobile will repetitively determine forward link SINR and communicate a maximum supportable data rate back to the base station via the mobile's reverse link channel.

FIG. 1 graphs the 1xEV forward link (base station to mobile unit) traffic channel, as well as reverse link data rate control channel and acknowledgement channel along a common time base. In accordance with the 1xEV specification, forward link traffic channel and reverse link control channel physical layer packets can be transmitted in 1 to 16 time slots, with each time slot being 1.66 milliseconds in duration at a data rate of 153.6 kbps. When more than one time slot is allocated to a subscriber, the forward link transmit slots use a 4-slot interlace. That is, adjacent transmit slots of a particular 4096 bit traffic packet are separated by three intervening slots, and slots of other packets are transmitted in the slots between those transmitted slots. If a positive acknowledgement is received on the reverse link ACK channel that the physical layer packet has been received on the forward link traffic channel before all of the allocated slots have been transmitted, the remaining untransmitted slots will not be transmitted and the next allocated slot is used for the first slot of the next physical layer packet transmission.

Diversity reception is a recognized technique to reduce effects of signal fading and/or co-channel interference. In this method, a resultant signal is obtained by a combination or selection, or both, of two or more sources of received-signal energy that carry the same modulation or user information content ("traffic"), but may differ in signal strength, or signal to interference plus noise (SINR), at any given instant. For example, a base station may transmit the same traffic simultaneously via two separate frequencies. Two receive chains of a mobile unit then provide the required two sources of received-signal energy for combinatorial diversity reception with each chain tuned to a respective one of the frequencies.

Open loop diversity is proposed for CDMA 3G air-interfaces, for example "orthogonal transmission diversity" or "OTD". In the OTD approach, the base station includes two transmit channels for transmitting simultaneously two coded signals via two spatially separated antennas. Each channel is coded with a unique Walsh code so that its information content or "traffic" is orthogonally related to the other channel's otherwise identical traffic. The mobile station or handset simultaneously receives the two signals at its antenna, amplitude and phase matches one of the received signals to the other via a RAKE receiver, and decodes the two Walsh coded channels, thereby enabling the information content of the channels to be combined in proper amplitude and phase in order to reduce effects of fading and co-channel interference. A block diagram depicting a base station BTS 10 having two transmit channels 12 and 14 is set forth in FIG. 2. Channel 12 includes an antenna or antenna array 16, and channel 14 includes an antenna or antenna array 18. Antennas 16 and 18 are, e.g., spatially separated. Antenna 16 transmits a signal over path 20 and antenna 18 transmits a signal over path 22.

Signal paths 20 and 22 arrive at an antenna 24 of a handset 26. Signal path 20 includes the forward link traffic and first interference, for example, and signal path 22 includes the same forward link traffic (coded to be orthogonal with respect to the traffic on path 20) and second interference. A RAKE receiver within handset 26 separates the two channels by virtue of the orthogonality of the Walsh coding, amplitude matches and phase matches the two channels, and combines the two channels together in a manner providing diversity reception.

As illustrated by FIG. 2, the OTD approach requires providing more transmit channels at the base station 10. If the base station 10 includes an antenna array for beam forming in order to provide coherent spatial gain at the mobile station or handset, implementing the OTD method requires two antenna arrays, thereby doubling the number of transmit channels, or reducing potential coherent gain by about 3 dB. One potential drawback of the OTD method is that each subscriber unit, e.g. handset 26, being serviced within the particular service sector requires two Walsh codes. While the OTD method proposes using QPSK modulation in order to double the number of available Walsh codes, there are ultimately only a finite number of available Walsh codes. Therefore, a base station potentially becomes capacity-limited to one half of the number of subscribers that can be simultaneously served with an air-interface using only a single Walsh code per subscriber unit, given the same finite number of available Walsh codes. Another drawback found with the OTD method is that if two channels and antennas are used to transmit from the base station, for much of the time the two channels will remain highly correlated at the handset location, and the advantages otherwise provided by diversity reception will not be realized.

One example of a receiver architecture for concurrent diversity reception is provided by U.S. Pat. No. 6,014,570 to co-inventor Piu Bill Wong and Donald Cox, entitled: "Efficient Radio Signal Diversity Combining Using a Small Set of Discrete Amplitude and Phase Weights", the disclosure thereof being incorporated herein by reference. In the approach described in the '570 patent, a handset includes two antennas. A first antenna receives a first signal, and a second antenna receives a second signal. The antennas are separated by spatial, polarization and/or pattern separation. Coupled to at least one of the antennas is a circuit for introducing a complex weight "A" having a gain component for varying the gain and a phase component for varying the phase of the signal received at the antenna to match the gain and phase of the signal received at the other antenna. The gain-matched and phase-matched signals are then combined in a combiner circuit within the receiver. In this prior approach, the gain and phase are constrained to be selected from a finite set of preselected discrete gains and a finite set of preselected discrete phases. While the approach of the '570 patent works well in reducing co-channel interference, it is hampered by its relative complexity and by a need to include two full receive channels, as well as two antennas, at the receiving location, whether base station or mobile unit (handset).

A hitherto unsolved need has arisen for a diversity reception method and architecture which provides the advantages of OTD without undesirable limitations thereof.

SUMMARY

One object of the present invention is to introduce diversity reception at the mobile unit in a manner overcoming a need to double the number of transmit channels at the base station.

Another object of the present invention is to provide a wireless communications air interface enabling reception of a base station signal by a mobile unit or handset equipped to carry out handset diversity in accordance with the principles of the present invention as well as enabling reception of a base station signal with a conventional handset.

A related object of the present invention is to provide a mobile unit or handset with a diversity reception capability employing a simple switching arrangement, thereby avoiding complexities in hardware and methods used in prior concurrent diversity reception approaches requiring plural receive channels in addition to plural antennas.

In accordance with one aspect of the present invention, a diversity handset is provided for use within a wireless communications network employing an air interface, such as CDMA. The network includes at least one base station operating in a transmit band for sending to the handset a pilot and Walsh coded traffic packets in plural time slots separated by separation time slots. The diversity handset includes a first antenna and a second antenna electrically separated from the first antenna in a predetermined way, such as by spatial separation of approximately one quarter mean wavelength, or by cross-polarization. An antenna switch switches a receiver between the two antennas. The receiver is most preferably a RAKE receiver responsive to the transmit band. The diversity handset also includes a time-of-arrival searcher circuit connected to the RAKE receiver to be responsive to the pilot for determining expected time of arrival of desired signals. The diversity handset also includes a controller for controlling the antenna switch based upon determined expected time of arrival of each time slot. First and second pilot integrators are connected to the RAKE receiver and are controlled by the controller. The first pilot integrator integrates pilot received via the first antenna. The second pilot integrator integrates pilot received via the second antenna. A pilot switch controlled by the controller switches between the first and second pilot integrators in synchronism with the antenna switch. A quadrature phase shift keying (QPSK) synchronous demodulator is connected to the RAKE receiver and is sequentially connected to said first and second pilot integrators by the pilot switch for synchronously demodulating received each slot of a traffic packet in accordance with integrated pilot corresponding to the particular antenna.

The foregoing objects and aspects of the present invention will be more fully understood and appreciated by those skilled in the art upon consideration of the following detailed description of preferred embodiments presented in conjunction with the accompanying drawings.

BRIEF DESCRIPTION OF THE DRAWINGS

Use of the same or similar reference numbers in different figures indicates same or like elements.

DETAILED DESCRIPTION OF THE PREFERRED EMBODIMENTS

In accordance with principles of the present invention, handset diversity is employed to obtain the performance gains of OTD without requiring multiple transmit channels at the base station. In this new approach, subscriber traffic is transmitted through a single base station antenna, and a subscriber handset receives the data stream through two alternated antennas. When no Rayleigh fading or differential co-channel interference is present, the system operates identically with a handset having a single antenna. When fading and/or differential co-channel interference are present, alternation between receive antennas at the handset achieves the same level of diversity as achieved by the OTD method. The handset of the present invention relies on error correction coding to recover any lost data.

Figure 1:
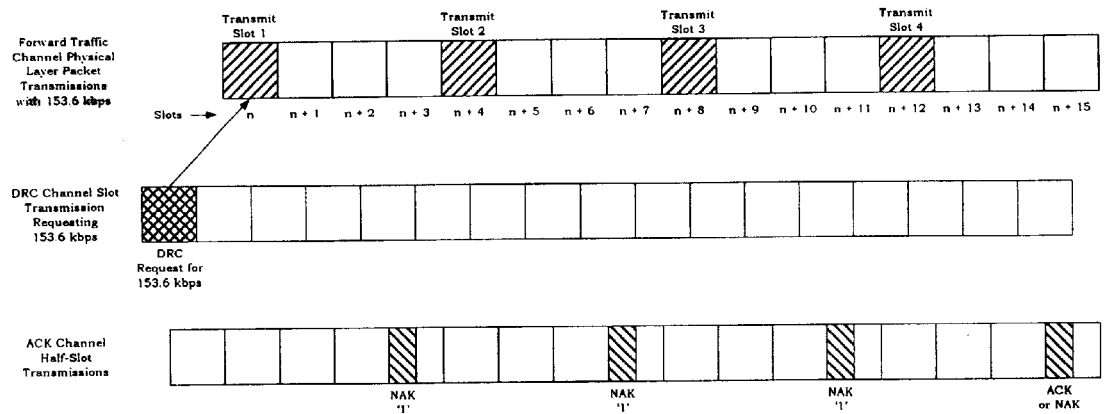
FIG. 1 is a timing diagram showing time slots of forward traffic channel and control channel physical layer packets within a 3G CDMA/HDR digital data traffic time division data signal format proposed by the 1xEV draft physical layer specification.
Figure 2:
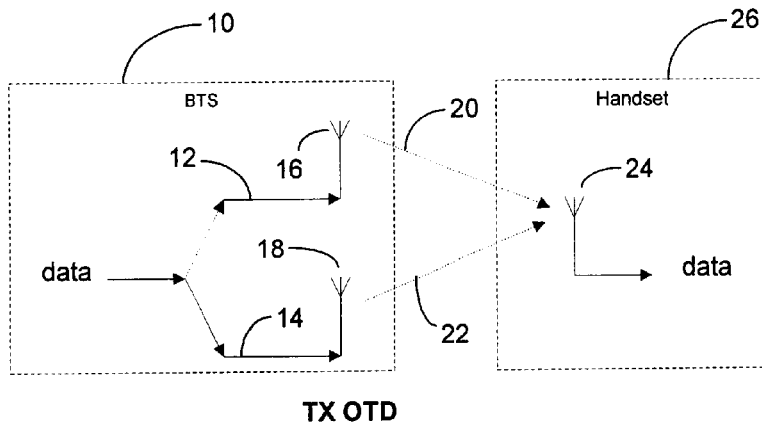
FIG. 2 is a high-level block diagram of a wireless communications system in accordance with the proposed OTD method.
Figure 3:
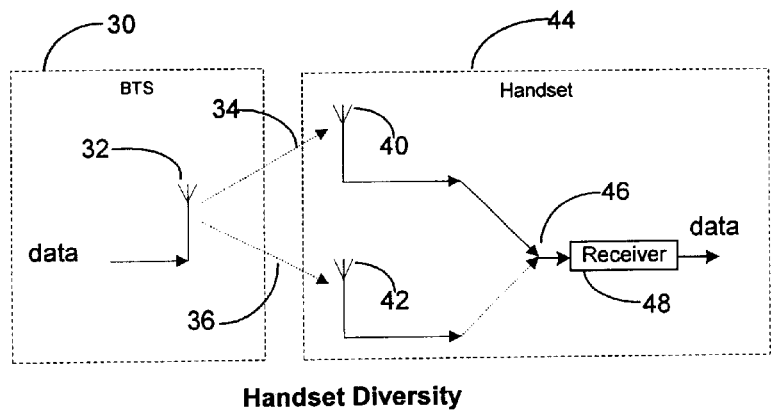
FIG. 3 is a high-level block diagram of a wireless communications system employing handset diversity methods and structures in accordance with principles of the present invention.

Referring now to FIG. 3, a wireless communication system in accordance with principles of the present invention includes a base station 30 which employs a single transmit channel and antenna 32 to transmit traffic to a handset 44 via multiple propagation channels, such as channel 34 and channel 36. The handset 44 includes two antennas. Antenna 40 receives the base station traffic via channel 34, and antenna 42 receives the base station traffic via channel 36. The antennas 40 and 42 may be separated spatially, in which case a spacing of at least one-quarter wavelength is preferred. Or the antennas 40 and 42 may have orthogonal polarization, for example, with one antenna being relatively vertically polarized and the other antenna being relatively horizontally polarized. By providing separation, either spatial or polarization or both, the signals received over channels 34 and 36 are decorrelated due to environmental conditions, Rayleigh fading, and other ambient phenomena.

Figure 4:
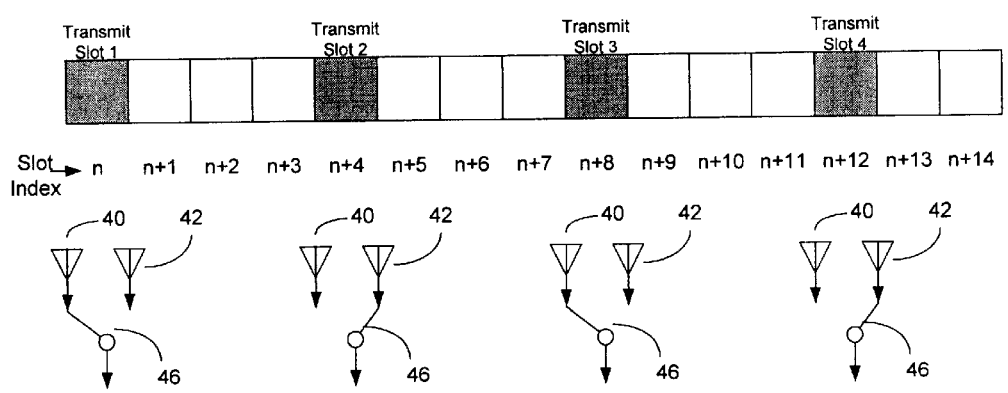
FIG. 4 is a timing diagram correlating forward traffic channel packet transmission time slots in accordance with the 1xEV specification with antenna switching events at a FIG. 3 handset diversity receiver, illustrative of principles of the present invention.

A switch function 46 within the handset 44 is synchronized to timing of the base station traffic and switches a RAKE receiver 48 of a single handset receive channel between antenna 40 and antenna 42. In a CDMA/1xEV air-interface wireless network, switching timing may be obtained from the base station's forward link pilot and most preferably occurs in accordance with the timing diagram set forth in FIG. 4. In the FIG. 4 switching example, for transmit slot 1 and transmit slot 3, the switch 46 selects antenna 40. For transmit slot 2 and transmit slot 4 the switch 46 selects antenna 42. Each slot in this example is 1.66 milliseconds in duration. So long as the switching occurs at the handset 44 outside of each time slot accorded to the handset, any switching transients will not perturb traffic being received by the receiver 48. The switching preferably occurs at the middle of the two transmit slots, so that the pilot integration durations on both branches can be balanced. The switching transition interval is made to be relatively "soft", in order to minimize introduction of any switching transients into the handset receiver 48.

At a 153.6 kbps data transfer rate in accordance with the 1xEV specification, each forward link traffic channel packet of 4096 bits uses four slots. Adjacent slots carrying portions of the packet are separated by a three-slot time interval. Each packet is encoded in accordance with a standard physical layer encoding scheme providing coding gain, such as a ¼ rate, and each packet includes standard error correction coding (ECC) and error detection coding overhead. Since the data packet traffic is spread over four slots, each slot provides one ECC interleave. If traffic from one of the slots (one ECC interleave) is lost, the ECC process will enable full recovery of the lost traffic. Other physical layer packets for other subscribers within the service sector can be sent in similar format arrangement within the intervening three slots separating adjacent slots of the first packet.

Figure 5:
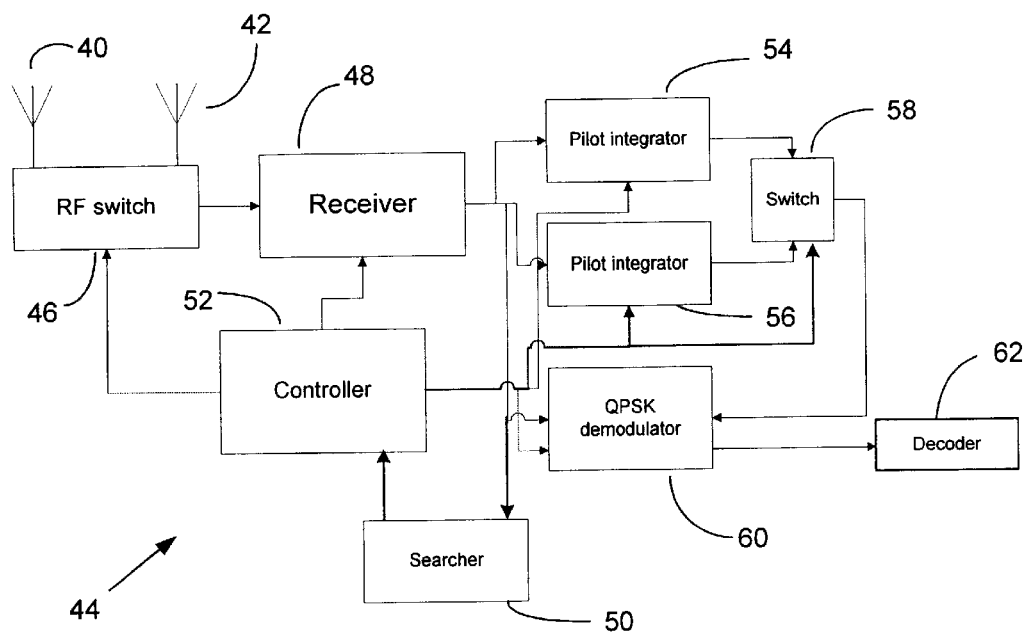
FIG. 5 is a block diagram of a handset diversity receiver incorporating handset diversity principles outlined in connection with FIG. 3.

FIG. 5 sets forth a more detailed block diagram of the handset 44 which realizes handset diversity in accordance with principles of the present invention. Therein, in addition to the dual antennas 40 and 42, an RF switch 46 and a receiver 48, a time-of-arrival searcher 50 responds to pilot and preamble information sent from the base station in order to determine time of arrival of the received signals and each of the time slots graphed in FIG. 4. The searcher 50 signals time-of-arrival information to a receiver controller 52 which controls two pilot integrators 54 and 56. For the CDMA/1x EV example given in FIG. 4, pilot integrator 54 integrates base station pilot received via antenna 40 for use in coherent demodulation of traffic received during slots 1 and 3; and, pilot integrator 56 integrates base station pilot received via antenna 42 for use in coherent demodulation of traffic received during slots 2 and 4. A switch 58, controlled by controller 52, supplies integrated pilot information to a QPSK demodulator 60, either from pilot integrator 54 (for slots 1 and 3) or from pilot integrator 56 (for slots 2 and 4). The QPSK demodulator 60 then provides demodulated encoded data to a decoder 62 for decoding and error detection and correction in a manner known within the CDMA art and as specified within the 1xEV physical layer specification referred to above, for example.

There are a number of advantages over the OTD method which result from practice of the present invention. For example, a base station can continue to use a single transmit channel and antenna with handset diversity, with a single Walsh code, per subscriber.

Because of a relatively wide angular signal spread of the forward link signal as viewed at the handset, another advantage is that the distance between the two antenna elements at the handset is rather small, e.g., approximately one quarter wavelength at the forward link frequency. Synchronized switching between the two small antennas of the handset is very easily implemented at relatively low cost, compared to the costs of modifying the base station to practice the OTD method. Therefore, a two-antenna implementation at the handset may be realized with considerably more simplicity than at the base station.

Another advantage results if a forward link adaptive antenna array is used at the base station. Diversity reception at the handset eliminates the need for OTD at the base station, and full coherent gain (3 dB advantage) can be realized with beamforming toward the handset via a two element adaptive antenna array without requiring any increase in the number of base station antenna elements.

Moreover, spatial diversity is lost in the OTD method when the handset is far away from the base station or when the base station observes a very small angle spread. On the other hand a relatively wide angular signal spread of the forward link signal is viewed at the handset, and therefore the handset will be able to make effective use of diversity reception most of the time.

While the present invention has been described with reference to particular embodiments, the description is only an example of the invention's application and should not be taken as a limitation. Various adaptations and combinations of features of the embodiments disclosed are within the scope of the invention as more particularly defined by the following claims.

What is claimed is:

1. A diversity reception handset for use within a wireless communications network including at least one base station for sending to the handset a pilot and a plurality of increments of traffic separated by separation intervals, the handset comprising:

a first antenna;

a second antenna electrically separated from the first antenna in a predetermined way;

a receiver coupled to the first and second antennas;

an antenna switch coupled to the antennas for switching the receiver between the two antennas;

a time-of-arrival searcher circuit coupled to the receiver and responsive to the pilot for determining expected time of arrival of each increment of said plurality of increments;

a controller coupled to the switch and the searcher circuit for controlling the switch based upon determined expected time of arrival of said each increment;

first and second pilot integrators coupled to the receiver and controlled by the controller, the first pilot integrator for integrating pilot received via the first antenna, the second pilot integrator for integrating pilot received via the second antenna; and a pilot switch coupled to the pilot integrators and controlled by the controller for switching between said first and second pilot integrators in synchronism with said antenna switch; and a coherent demodulator coupled to said receiver and sequentially connected to said first and second pilot integrators for coherently demodulating each received increment of traffic in accordance with integrated pilot corresponding to a said antenna through which the increment passed to the receiver.

2. A diversity reception handset for use within a wireless communications network having at least one base station operating in a transmit band for sending to the handset a pilot and traffic packets, each packet sent as increments in plural time slots separated by separation time slots, the handset comprising:

a first antenna and a second antenna electrically separated from the first antenna in a predetermined way;

a RAKE receiver coupled to the first and second antennas;

an antenna switch coupled to the antennas and the RAKE receiver for switching the RAKE receiver responsive to the transmit band between the two antennas;

a time-of-arrival searcher circuit coupled to the RAKE receiver and responsive to the pilot for determining expected time of arrival of each slot of a packet being sent to the handset;

a controller coupled to the searcher circuit for controlling the switch based upon determined expected time of arrival of each slot;

first and second pilot integrators coupled to the RAKE receiver and controlled by the controller, the first pilot integrator for integrating pilot received via the first antenna, the second pilot integrator for integrating pilot received via the second antenna;

a pilot switch coupled to the pilot integrators and controlled by the controller for switching between outputs of said first and second pilot integrators in synchronism with said antenna switch; and a coherent demodulator coupled to said RAKE receiver and sequentially coupled to said first and second pilot integrators for coherently demodulating each received increment of traffic in accordance with integrated pilot corresponding to a said antenna through which the increment passed to the RAKE receiver.

3. The diversity reception handset set forth in claim 2, wherein the second antenna is polarized with the first antenna, and wherein the predetermined way is spatial separation by at least one quarter mean wavelength of the transmit band.

4. The diversity reception handset set forth in claim 2, wherein the second antenna is polarized in an orthogonal direction relative to a polarization of the first antenna.

5. The diversity reception handset set forth in claim 2, wherein plural slots comprising a single traffic packet comprise interleaves of an error correction code symbol covering said packet and further comprising an error correction code processor for correcting detected errors in said packet.

* * * * *